United States Patent Office 2,780,888
Patented Feb. 12, 1957

2,780,888

TREATMENT OF SOIL WITH SOIL CONDITIONING AGENTS CONTAINING CARBOXYMETHYL DEXTRAN

Leo J. Novak and Everett E. Witt, Dayton, Ohio, assignors, by mesne assignments, to Midland Chemical Corporation, Dayton, Ohio, a corporation of Delaware No Drawing. Application February 18, 1955,
Serial No. 489,268

18 Claims. (Cl. 47—58)

This invention relates to the treatment of soil and more particularly to compositions and a method of treating the soil to render it porous and readily workable and stabilize it in that condition.

Among the important characteristics of all soils are (1) the soil texture or the relative proportions of the individual grain or particle sizes; and (2) the structure or the physical form of the soil particles. The soil structure is of great importance and a granular structure in which the aggregates vary in size from very small to about one-half inch in diameter is regarded as being in a desirable condition. Soils of the best productivity are those having a granular structure and sufficient porosity for air, water and plant roots to penetrate through the soil, as well as the capacity to retain sufficient water between rains for fostering plant growth. It may be difficult, however, to maintain soil in the desired granular, porous, moisture-retentive condition. Even improper tillage will, in some cases, destroy the granular form and bring about agglomeration of the soil into very large masses which tend to pack on wetting. This aggregation of the soils into undesirably large masses can only be overcome by careful working for a period of time which may be years.

Considerable research has been conducted of recent years in connection with the conditioning of soil, the objective being to provide conditioning agents or compositions which, when mixed with soil, will stabilize it in the form of small discrete aggregates and render it porous and capable of retaining moisture without packing or the formation of large unworkable masses.

A primary object of this invention is to provide new soil conditioning agents which, when applied to soil of various types, effect aggregation of the soil particles into small, readily workable crumbs or agglomerates, stabilizes the soil in the small aggregate condition, and renders it porous so that it is readily penetrated by air, water, and plant roots.

Another object is to provide new soil conditioning agents which, while basically of given chemical constitution, vary in specific constitution and properties, permitting selection of specific agents for use as optimum soil conditioning agents for different types of soils.

Another object of the invention is to provide new, highly effective soil conditioning agents which are both relatively low in cost and highly effective in relatively small concentrations whereby the proper conditioning of large soil areas becomes practical from the economic viewpoint.

These and other objects are accomplished by this invention which provides soil conditioning compositions comprising carboxymethyl dextran.

Carboxymethyl dextran may be produced as described in the pending application of Leo J. Novak et al., Serial No. 346,016, filed March 31, 1953. Briefly, the selected dextran and carboxymethylating agent are reacted together in an aqueous alkaline medium whereby the carboxymethyl group is substituted for one or more hydroxyl groups in the dextran molecule. Suitable carboxymethylating agents are chloracetic acid, sodium chloracetate or chloracetamide. The reaction is carried out in an aqueous solution of a strong alkali metal hydroxide such as sodium, potassium or lithium hydroxide. Preferably, a solution or dispersion of the dextran in water containing an excess of sodium or potassium chloracetate and an excess of sodium or potassium hydroxide is heated at a temperature of 50° C. to 100° C. for ten minutes to two hours. The molar ratio of sodium or potassium chloracetate to dextran may be 2:1–12:1, the molar ratio of the hydroxide to dextran may be 5:1–15:1, and the molar ratio of water to dextran may be 70:1–120:1. The carboxymethyl dextran obtained has a D. S. (degree of substitution or average number of carboxymethyl groups per anhydroglucopyranosidic unit) of 0.2 to 3.0.

The reaction product is a viscous mass comprising the alkali metal salt of the ether, which may be precipitated from the crude product by addition of a water-miscible alcohol or ketone such as methyl, ethyl, propyl, isopropyl or t-butyl alcohol, or acetone.

The ether may be liberated from the salt by mixing the latter with water acidified to pH 2.0–3.0, and adding a water-miscible alcohol or ketone to precipitate the ether. The pH of 2.0–3.0 is not critical and precipitation may be at other pH values. However, highest yields of the ether have been obtained by precipitation at pH 2.0–3.0.

The dextran may be obtained by the action of microorganisms of the *Leuconostoc mesenteroides* and *L. dextranicum* types or their enzymes. The sucrose-bearing nutrient medium is inoculated with a culture of the microorganism or the enzyme filtered from the culture and the mass is incubated until the dextran is synthesized in maximum yield, when the dextran is precipitated by means of a water-miscible alcohol or ketone, purified, dried and, for reaction with the carboxymethylating agent, preferably reduced to particulate condition. This native high molecular weight dextran may be converted to the ether, or it may be partially hydrolyzed to lower molecular weight before such conversion. In general, the dextran may have a molecular weight between that of the native, microbiologically produced dextran and about 2000. Microorganisms or their enzymes which may be used to convert sucrose to the dextran include the following strains identified by the NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

Carboxymethyl dextran derived from native microbiologically produced dextran that is inherently water soluble, such as native *L. m.* B–512 dextran, the ether containing an average of 0.2 to 3.0 carboxymethyl groups per AGU, may be preferred for some soils.

However, the dextrans vary widely in the extent of branching and the molecular structural repeating 1,6 to non-1,6 linkages ratios, and selection of the carboxymethyl dextran to be used for conditioning a particular type of soil may be based on both the starting dextran and the D. S. with respect to carboxymethyl groups. Thus, one type of soil, such as a sandy soil, may be more effectively conditioned by treatment with a carboxymethyl ether of a dextran having a low 1,6 to non-1,6 linkages ratio, say a ratio of 1.9 to 10:1 of relatively low or high molecular weight and having a D. S. of 0.1 to 3.0, while the ethers of dextrans having a higher 1,6 to non-1,6 linkages ratio of 10:1 to 30:1 and of low or high molecular weight may be more useful with other soils.

The carboxymethyl dextrans are effective soil conditioning agents in very small concentrations. In actual tests, amounts as low as 0.01% to 0.1% by weight have been found effective. In this respect, the carboxymethyl dextrans differ from other soil conditioning agents proposed heretofore, which usually are really satisfactory only at higher concentrations.

The carboxymethyl dextran may be applied to the soil in dry particulate granular or powdered condition and incorporated therewith or mixed therein to the desired depth by spading, disking, harrowing or other mixing methods commonly employed in agriculture and while the soil contains sufficient moisture to permit ready incorporation of the dry carboxymethyl dextran therein. Water may be applied to the soil after the carboxymethyl dextran is mixed with it, or rainfall or the moisture present in the soil may be relied on to dissolve or swell the dextran ether. Or the carboxymethyl dextran may be applied to the soil in the form of an aqueous spray. In another modification, the dry particulate carboxymethyl dextran may be compressed to obtain pellets which may be planted in the soil to the desired depth. The pellets may be obtained by treating powdered or granular carboxymethyl dextran with a limited amount of water or other solvent or swelling agent sufficient to render the mass cohesive, and molding the paste thus obtained by extruding it through a die under pressure to produce a rod that can be cut into pellets of appropriate size for incorporation in the soil. The carboxymethyl dextran may also be used as a mulch.

When exposed to moisture in contact with the soil, the carboxymethyl dextran binds the soil particles into small, readily workable crumbs or aggregates and stabilizes the soil in the crumb condition. The ether dissolves or swells in the moisture in the soil to form a matrix with the soil particles, the matrices of the adjacent particles tending to adhere to each other to bind the particles together. One of the attributes or characteristics which makes carboxymethyl dextran specifically effective as a soil conditioner and stabilizer in unusually low concentration is its outstanding inherent and unique effectiveness as a gelling agent in aqueous systems. In this respect, carboxymethyl dextran is superior to the available carboxymethyl celluloses.

Our research results indicate that the carboxymethyl ether of native, microbiologically produced water-soluble dextran, such as the carboxymethyl ether of L. m. B–512 native dextran containing an average of 1.0 carboxymethyl group per A. G. U. is a particularly effective conditioning agent for most soils. This ether swells greatly and hydrates very readily in the presence of moisture, imbibing water into the individual ether particles until all water present is imbibed, i. e., there is a point where maximum gellation occurs due to imbibition of water by the ether and swelling and hydration thereof, but at which a true colloidal solution of the ether does not occur.

It has been noted that, in general, if the structure of a soil is unsatisfactory, that is, if the structure is such that water is not absorbed without puddling and the soil is easily eroded and washed away by rain, the soil will be found to be deficient in plant nutrients. If it is attempted to compensate for the deficiency by adding large amounts of fertilizers to the soil, the nutrients are lost by the leaching action of rain before they can be assimilated by plants growing in the soil. The result is that fertilizers must be added to the soil often, and are partially wasted since only a portion thereof remains with the soil long enough to be utilized by the plants. It is within the scope of this invention to apply mixtures of carboxymethyl dextran and plant nutrients to the soil. This has the advantage that the carboxymethyl dextran, a large molecule material, by slowly swelling, hydrating and possibly dissolving in the moist soil, acts as a control and regulator for release of the plant nutrients compounded with it. These mixtures thus have the two-fold advantage that the structure of the soil is modified and improved and the plant nutrients are maintained in contact with and slowly released to it over a protracted period of time such that the supply of the nutrients is more or less in balance with the rate of assimilation thereof.

Examples of plant nutrients which may be mixed with the dextran ether include organic fertilizers such as sewage, sludge, processed sewage, "Milorganite," urea, soybean meal, guano, dried blood, humus, animal manures, compost, bone meal, sawdust, peat moss, animal tankage and other plant and animal waste products. Inorganic fertilizers may also be used, including limestone, ammonium salts, potassium salts, nitrates, phosphates, and other substances containing nitrogen potassium, calcium and phosphorus, as well as essential trace elements of the type of boron, manganese, magnesium, cobalt, molybdenum, iron, etc.

The organic fertilizers usually do not have high fertilizing or nutrient value, and therefore those fertilizers having high nitrogen, phosphorus and potassium content are preferred. Fertilizers of this type usually are made up essentially of nutrient minerals and may have from 15% to 50% of their weight as elemental nitrogen, phosphorus pentoxide and potassium monoxide.

Typical mixtures may comprise, by weight, 1.0 to 99 parts of the carboxymethyl dextran and, conversely, 99 to 1.0 part of fertilizer. Generally, a mixture of 10 to 90 parts carboxymethyl dextran and 90 to 10 parts fertilizer are satisfactory, although mixtures having other compositions such as 70 parts carboxymethyl dextran and 30 parts fertilizer, or 60 parts carboxymethyl dextran and 40 parts fertilizer may be used. A useful fertilizer may comprise 6% to 10% elemental nitrogen, 10% to 15% phosphorus pentoxide and 4 to 10% potassium monoxide.

Mixtures of the nutrient or fertilizer and carboxymethyl dextran may be used in loose form, in aqueous medium, or as compressed pellets.

As already mentioned, carboxymethyl dextran is an effective soil conditioning and stabilizing agent in unusually small concentrations and the particular ether used may be selected for highest effectiveness with a given soil on the basis of the starting dextran molecular weight and the D. S. of the latter with respect to carboxymethyl groups. In general, amounts of the ether between 0.01% and 0.1% on the soil weight give desirable results. Depending on the soil and its condition before the treatment, and on the ether used, somewhat larger amounts, up to 0.5% may be indicated. The amount of fertilizer used, if such is to be applied to the soil, in addition to the dextran ether, depends on the condition of the soil but is sufficient to bring the soil to normal productive condition with respect to the concentration of plant nuerients and essential plant soil components.

It is sometimes advantageous to incorporate nitrogen-fixing bacteria in the soil and such bacteria may be incorporated in combination with or in conjunction with carboxymethyl dextran or mixtures of the ether and fertilizers. Bacteria of the genus Rhizobia may be used and may be mixed with the carboxymethyl dextran before the latter is added to the soil. These bacteria are effective with certain plants of the genus Leguminosae when grown in symbiotic relation therewith, to fix the nitrogen of the air and convert it to nitrogenous compounds which enrich the soil around the plants and provide nitrogenous nutrient for other succeeding crops. Plant species capable of fixing nitrogen in combination with Rhizobia include alfalfa, clover, beans, soy beans, lupines, and trefoil. The different species of Rhizobia are usually effective with particular plant species. Thus, *Rhizobium meliloti* is useful with alfalfa or with white or sweet clover; *Rhizobium trefolii* is useful with red, white and crimson clovers; *Rhizobium leguminosarium* infects garden peas and vetch; while *Rhizobium lupini* is more useful with lupines, *Rhizobium paponicum* with soy beans, etc. The Rhizobium bacterium may be selected having regard to the crop to be cultivated in the soil being conditioned.

In preparing compositions comprising the carboxymethyl dextran and Rhizobia or similar nitrogen-fixing bacteria, the bacteria contained in a culture liquid is first centrifuged or filtered therefrom, to obtain the bacteria as a sludge, the sludge is spread out at room temperature and dried, and the dry powder containing the bacteria is dry-mixed with the carboxymethyl dextran- or carboxymethyl dextran plus fertilizer to the extent of about 0.1% by weight.

Tests show that when soil is conditioned by the addition of carboxymethyl dextran in the amounts recommended, soil of unsatisfactory structure becomes loose, crumbly and porous and exhibits increased moisture retention without, however, puddling or caking when wet. The soil may be conditioned and stabilized for agricultural or horticultural use, or the invention may be applied to conditioning soils which normally become impassable on wetting. Such soils remain in passable condition after treatment thereof with the carboxymethyl dextran.

In one series of tests, using the carboxymethyl ether of L. m. B-512 native dextran containing an average of 1.0 carboxymethyl group per A. G. U. in amounts of 0.1% and 0.3%, by weight on the soil weight, the effect of the ether on soil stability was determined by wet sieve analyses with the results tabulated below:

| Amount of CMD | Present Stability of Soil | Percent Increase |
|---|---|---|
| None (Control) | [1] 41.4 | |
| 0.1% CMD | 74.8 | 80.6 |
| 0.3% CMD | [2] 95.2 | 130.0 |

[1] Average of 3 tests (43.3, 41.5 and 39.5).
[2] Average of 2 tests (93.0 and 97.4).

These results are striking and compare very favorably with the results obtained with the much more expensive material, "Krilium." In fact, we found that at 0.3% concentration, the carboxymethyl dextran was just as effective in increasing the stability of the soil as "Krilium," the increase being obtained at much less expense, using the dextran ether, than is incurred when "Krilium" is used.

The carboxymethyl ethers of other dextrans also effectively increase the stability of soil when mixed therewith.

Since some variations and modifications may be made in practicing the invention, without departing from the spirit and scope thereof, it is to be understood that we do not intend to limit the invention except as defined in the appended claims.

What is claimed is:

1. A soil conditioning and stabilizing composition comprising as the essential soil conditioning component thereof, from 0.01% to 0.5% by weight of a carboxymethyl ether of water-soluble native dextrin containing an average of about 1.0 carboxymethyl group per anhydroglucopyranosidic unit of the dextran.

2. A soil conditioning and stabilizing composition comprising carboxymethyl dextran and, for fertilizing the soil, a plant nutrient material.

3. A soil conditioning and stabilizing composition compriseing carboxymethyl dextran and active nitrogen-fixing bacteria.

4. A soil conditioning and stabilizing composition comprising carboxymethyl dextran and active nitrogen-fix- and active nitrogen-fixing bacteria.

5. A soil conditioning and stabilizing composition comprising carboxymethyl dextran in admixture with nitrogen-fixing bacteria of the genus Rhizobia.

6. A soil conditioning and stabilizing composition comprising a carboxymethyl ether of native, microbiologically produced, water-soluble dextran containing an average of 0.2 to 3.0 carboxymethyl groups per anhydroglucopyranosidic unit.

7. A soil conditioning and stabilizing composition comprising a carboxymethyl ether of native, microbiologically produced, water-soluble dextran containing an average of about 1.0 carboxymethyl group per anhydroglucopyranosidic unit.

8. The method of conditioning and stabilizing soil which comprises adding to the soil a carboxymethyl dextran and insuring sufficient moisture in the soil to cause swelling and hydration of the carboxymethyl dextran in contact with the soil, form a matrix of the carboxymethyl dextran with the soil particles, and bind the particles into relatively small, readily workable aggregates.

9. The method of conditioning and stabilizing soil which comprises adding to the soil a dry particulate composition comprising carboxymethyl dextran and subsequently moistening the soil to facilitate swelling and hydration of the carboxymethyl dextran therein.

10. The method of conditioning and stabilizing soil which comprises spraying the soil with an aqueous medium containing carboxymethyl dextran, and mechanically working the soil to incorporate the carboxymethyl dextran therein to the desired depth, and insuring sufficient moisture in the soil to facilitate swelling and hydration of the carboxymethyl dextran therein.

11. The method of conditioning and stabilizing soil which comprises adding to the soil a composition comprising carboxymethyl dextran in admixture with a plant nutrient material, and insuring sufficient moisture in the soil to facilitate swelling and hydration of the carboxymethyl dextran therein.

12. The method of conditioning and stabilizing soil which comprises adding to the soil a composition comprising carboxymethyl dextran in admixture with active nitrogen-fixing bacteria, and insuring sufficient moisture in the soil to facilitate swelling and hydration of the carboxymethyl dextran therein.

13. The method of conditioning and stabilizing soil which comprises adding to the soil a composition comprising carboxymethyl dextran in admixture with active nitrogen-fixing bacteria of the genus Rhizobia, and insuring sufficient moisture in the soil to facilitate swelling and hydration of the carboxymethyl dextran therein.

14. The method of conditioning and stabilizing soil which comprises adding to the soil a composition comprising carboxymethyl dextran, plant nutrient material for fertilizing the soil, and active nitrogen-fixing bacteria, and insuring sufficient moisture in the soil to facilitate swelling and hydration of the carboxymethyl dextran therein.

15. The method of conditioning and stabilizing soil which comprises adding to the soil a composition comprising carboxymethyl dextran, plant nutrient material for fertilizing the soil, and active nitrogen-fixing bacteria of the genus Rhizobia, and insuring sufficient moisture in the soil to facilitate swelling and hydration of the carboxymethyl dextran therein.

16. The method of conditioning and stabilizing soil which comprises adding to the soil a composition comprising a carboxymethyl ether of native, microbiologically produced, water-soluble dextran containing an average of 1.0 to 3.0 carboxymethyl groups per anhydroglucopyranosidic unit and insuring sufficient moisture in the soil to cause swelling and hydration of the carboxymethyl dextran in contact with the soil, form a matrix of the ether with the soil particles, and bind the particles together in the form of relatively small, readily workable aggregates.

17. The method of conditioning and stabilizing soil which comprises adding to the soil a composition comprising a carboxymethyl ether of native, microbiologically produced, water-soluble dextran containing an average of about 1.0 carboxymethyl group per anhydroglucopyranosidic unit and insuring sufficient moisture in the soil to cause swelling and hydration of the carboxymethyl dextran in contact with the soil, formation of a matrix of the ether with the soil particles, and binding of the particles together as relatively small, readily workable aggregates.

18. In combination, soil and a carboxymethyl ether of dextran.

References Cited in the file of this patent
UNITED STATES PATENTS

| | | |
|---|---|---|
| 2,518,135 | Gaver | Aug. 8, 1950 |
| 2,609,368 | Gaver | Sept. 2, 1952 |
| 2,671,779 | Gaver | Mar. 9, 1954 |

OTHER REFERENCES

Geoghegan: "Aggregate Formation in Soil," published 1950 by Hoitsema Bros. (Groningen, Netherlands), in Fourth Inter-National Congress of Soil Science, Amsterdam 1950, Transactions; vol. 1, pages 198 through 201.